US011018537B2

(12) United States Patent
Kelly

(10) Patent No.: US 11,018,537 B2
(45) Date of Patent: May 25, 2021

(54) METHOD OF CONSTRUCTION FOR PERMANENT MAGNET GENERATOR

(71) Applicant: GREENSPUR RENEWABLES LIMITED, London (GB)

(72) Inventor: Hugh-Peter Granville Kelly, Westcliff on Sea (GB)

(73) Assignee: TIME TO ACT LIMITED, Hatfield (GB)

( * ) Notice: Subject to any disclaimer, the term of this patent is extended or adjusted under 35 U.S.C. 154(b) by 0 days.

(21) Appl. No.: 15/574,224

(22) PCT Filed: May 19, 2016

(86) PCT No.: PCT/GB2016/051446
§ 371 (c)(1),
(2) Date: Nov. 15, 2017

(87) PCT Pub. No.: WO2016/185216
PCT Pub. Date: Nov. 24, 2016

(65) Prior Publication Data
US 2018/0138768 A1 May 17, 2018

(30) Foreign Application Priority Data
May 19, 2015 (GB) ...................... 1508568

(51) Int. Cl.
*H02K 1/30* (2006.01)
*H02K 1/27* (2006.01)
(Continued)

(52) U.S. Cl.
CPC ............. *H02K 1/30* (2013.01); *H02K 1/2793* (2013.01); *H02K 16/00* (2013.01); *H02K 7/083* (2013.01); *H02K 2201/03* (2013.01); *Y02E 10/72* (2013.01)

(58) Field of Classification Search
CPC ........ H02K 1/27; H02K 16/00; H02K 1/2793; H02K 1/30; H02K 7/083; H02K 2201/03; Y02E 10/725
See application file for complete search history.

(56) References Cited

U.S. PATENT DOCUMENTS 3,375,386 A * 3/1968 Haynerpaulf ............ H02K 3/26
310/268
5,767,598 A 6/1998 Kano et al.
(Continued)

FOREIGN PATENT DOCUMENTS

JP 2008187872 A 8/2008
JP 2009284745 A 12/2009
(Continued)

OTHER PUBLICATIONS

PCT International Search Report and Written Opinion, PCT/GB2016/051446, dated Jul. 28, 2016.
(Continued)

*Primary Examiner* — Naishadh N Desai
(74) *Attorney, Agent, or Firm* — Quarles & Brady LLP

(57) ABSTRACT

A generator comprises as a first part a stack of disc-like annular rotors spaced one from the other and coaxially located upon and rotating with an elongate central member each rotor having an inner annular portion and an outer annular portion, the outer annular portion bearing and/or comprising a magnetic annulus, one or more spacers being coaxially mounted around the central member in between the inner annular portions of each rotor and abutting against them in such manner such as to brace them to remain orthogonal to the longitudinal axis of the assembly as well as providing the required spacing therebetween, and as a second part, a stack of annular stators interposed between the rotors and mounted over the spacers but having an inner (Continued)

clearance diameter greater than that of the outer diameter of the portion of spacer over which they are located.

7 Claims, 5 Drawing Sheets

(51) Int. Cl.
*H02K 16/00* (2006.01)
*H02K 7/08* (2006.01)

(56) References Cited

U.S. PATENT DOCUMENTS

| | | | |
|---|---|---|---|
| 5,945,766 A | | 8/1999 | Kim et al. |
| 6,720,688 B1 | | 4/2004 | Schiller |
| 7,081,696 B2 | * | 7/2006 | Ritchey .............. H02K 7/108 |
| | | | 310/114 |
| 8,115,364 B2 | | 2/2012 | Minowa et al. |
| 8,299,676 B2 | | 10/2012 | Miyata et al. |
| 8,716,913 B2 | | 5/2014 | Kvam et al. |
| 2004/0041409 A1 | * | 3/2004 | Gabrys .............. H02K 19/103 |
| | | | 290/55 |
| 2008/0042515 A1 | | 2/2008 | Butterfield |
| 2008/0238266 A1 | | 10/2008 | Moriyama et al. |
| 2010/0001533 A1 | * | 1/2010 | Jefferson .............. H02K 21/24 |
| | | | 290/55 |
| 2011/0156519 A1 | | 6/2011 | Wang et al. |
| 2015/0022919 A1 | | 8/2015 | Wei |

FOREIGN PATENT DOCUMENTS

| | | |
|---|---|---|
| WO | 2009/001917 A1 | 12/2008 |
| WO | 2009071843 A2 | 6/2009 |
| WO | 2012142230 A2 | 10/2012 |
| WO | 2014/036883 A1 | 3/2014 |

OTHER PUBLICATIONS

Search Report dated Nov. 19, 2015 in connection with GB1508568.1.

* cited by examiner

METHOD OF CONSTRUCTION FOR PERMANENT MAGNET GENERATOR

CROSS-REFERENCE TO RELATED APPLICATIONS

This application represents the national stage entry of PCT International Application No. PCT/GB2016/051446 filed May 19, 2016, which claims priority to Great Britain Patent Application 1508568.1 filed May 19, 2015, the contents of which are hereby incorporated herein by reference for all purposes.

The following invention relates to an improved method of construction for axial permanent magnet rotary generators. In particular it relates to an improved method of construction for the generator of co-pending patent application, no. GB 1320623.0.

It is known to construct axially magnetised generators from a stack of rotors spaced one from the other and mounted along and upon a central common axle for communicating torque thereto. A stack of stators in the form of coil carrying plates is interposed between the rotors. The rotors bear permanent magnets and electricity is generated as the magnetic fields provided by the turning rotors cut the turns of the coils embedded within the stators. An example of such a construction is given in US 2008/0231132.

While this method of construction may be practical for smaller generators, for example those having rotor diameters of one meter or less, it rapidly becomes impractical for much larger configurations. Larger generators, such as those used in wind turbines to capture off shore wind power and having outputs in the megawatt range, may require the use of rotors having diameters of six or even eight meters.

An important aspect to the operation of these larger scale generators is the maintaining of a small and unwavering airgap between the magnets mounted upon the rotors and the stators sandwiched by them. Any weakness in maintaining this air gap can lead to catastrophic failure, for example were the rotor magnets to come into contact with and scrape across the stator coils. It is not feasible to rely solely upon the inherent rigidity of the rotors when mounted on a single central axle given the large electromagnetic forces at play in these configurations. To achieve an effective and cost efficient use of the magnetic and copper materials used therein, the axial widths of the rotors and stators sandwiched between them are necessarily notably thin, for example just 50 mm each. Therefore there is little opportunity for the rotors themselves to be made adequately stiff.

According to the invention, a generator comprises as a first part a stack of disc-like annular rotors spaced one from the other and coaxially located upon and rotating with an elongate central member each rotor having an inner annular portion and an outer annular portion, the outer annular portion bearing and/or comprising a magnetic annulus, one or more spacers being coaxially mounted around the central member in between the inner annular portions of each rotor and abutting against them in such manner such as to brace them to remain orthogonal to the longitudinal axis of the assembly as well as providing the required spacing therebetween, and as a second part, a stack of annular stators interposed between the rotors and mounted over the spacers but having an inner clearance diameter greater than that of the outer diameter of the portion of spacer over which they are located.

In practice, the spacers may comprise one or more tubular members.

By this means, at least a substantial portion of the rotor, being that defined by the radial width of the inner annulus portion, is prevented by the spacer abutting against it from flexing out of line or vibrating. Given that typical rotors are fabricated from appreciably rigid materials, this inner bracing of the rotor is effective also to brace its outer annulus portion and thereby substantially to prevent flexing thereof and compromising the aforesaid air gap.

According to a feature of the invention, the diameter of the cross section of the spacers at a longitudinal position corresponding to a stator is less than the diameter of portions of spacers pressing against sides of the rotors.

By this means, the inner diameter of the stator itself can be commensurately reduced, so enhancing its intrinsic strength and rigidity, while still maintaining a wide diameter of tubular member pressing against and providing stability to the rotor inner annulus portion surface.

The overall weight of generators used in certain applications, for example in the nacelles of wind turbines, is of considerable significance in terms of the strength and cost of the foundations supporting the same.

According to a feature of the invention, the elongate central member upon which the rotors are mounted, is in the form of a cylinder. The cylinder provides a central alignment means for the rotors and tubular members mounted coaxially thereon, while substantially reducing the combined radial width of the combined inner and outer annulus portions of the rotors. The rotor weights are therefore considerably reduced. Taking for example a typical configuration in which twenty steel rotors are utilised, having external diameters of six meters and a thickness of 10 mm, and spaced at every 100 mm. Their combined weight when mounted on a shaft of modest diameter is in the region of 40 tonnes. Replacing this shaft by a cylinder having a diameter of, for example, four meters, nearly halves this rotor weight to 22 tonnes, while the supporting cylinder, which may be fabricated from aluminium, weighs only 1.35 tonnes.

The principle of the present invention still applies however. A balance is taken during design between the outer diameter of the cylinder and the remaining radial width of the tubular members, to ensure that an adequate volume and flank of the members is present to support the rotors they are located against.

In an embodiment the outer diameter of the spacers (for example at a longitudinal position corresponding to the stator, or at a maximum diameter of the spacer or at a position where the spacer presses against the rotor) is at least half, preferably at least two thirds of the outer diameter of the magnetic annulus. This is advantageous in terms of placing the stator coils and rotor magnets at a position of greatest velocity of the rotor and also leaving a significant area to be braced by the spacer, to the advantage of the stability of the rotor.

An advantage arising from the use of the tubular member is that its outer perimeter, abutting the rotor, can be used to provide an inner datum for locating the rotor permanent magnets during manufacture. Thus permanent magnets of the magnetic annulus abut against the spacer.

In an aspect there is provided a generator comprising as a first part a stack of disc-like annular rotors spaced one from the other, each rotor having an inner annular portion and an outer annular portion, the outer annular portion bearing and/or comprising a magnetic annulus, one or more spacers being mounted in between the inner annular portions of each rotor and abutting against them in such manner such as to brace them to remain orthogonal to the longitudinal axis of the assembly as well as providing the required spacing therebetween, the spacers and the rotors being held together longitudinally by a plurality of bolts passing through the spacers and rotors, and as a second part, a stack of annular stators interposed between the rotors and mounted over the spacers but having an inner clearance diameter greater than that of the outer diameter of the portion of spacer over which they are located. An advantage of this aspect is reduction in assembly cost.

In an embodiment the spacers and/or rotors are radially spaced from the elongate central member/longitudinal central axis of the first part. In an embodiment the distance between the central longitudinal axis of the first part and an inner diameter of the rotors and/or spacers is at least ½ the outer radius of the rotors. An advantage of this aspect is reduced weight.

The invention will now be described with reference to the accompanying drawings in which.

Figure 1:
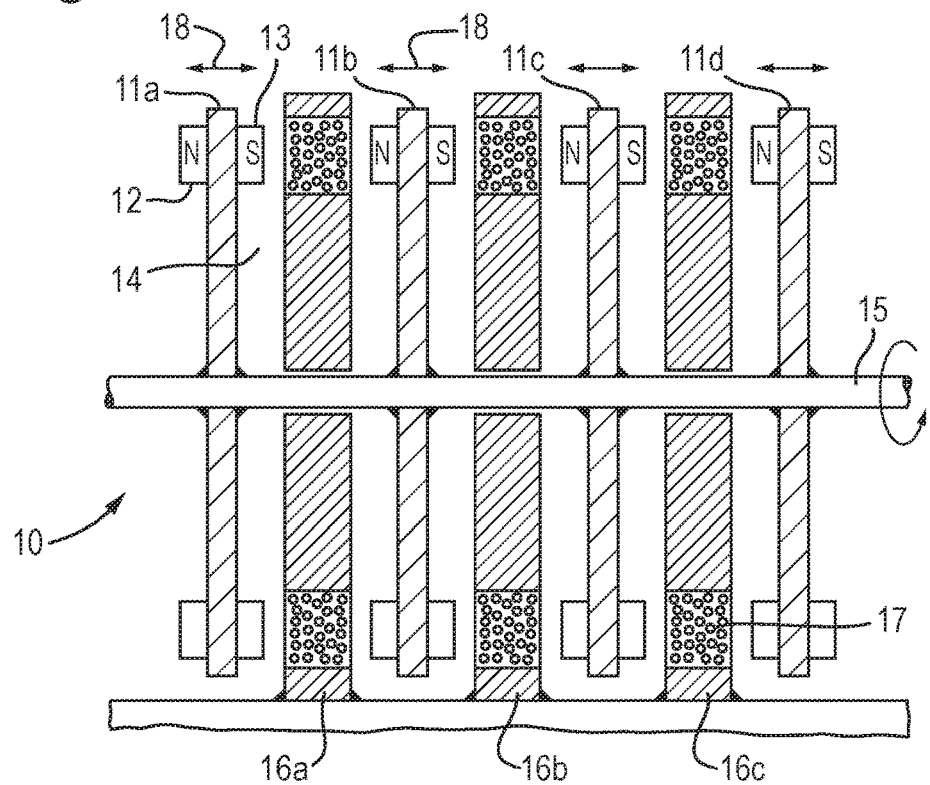
FIG. 1 shows rotors mounted upon a shaft, without tubular members therebetween.

Referring to FIG. 1, a sectional view of a prior art generator is shown at 10. A stack of circular rotor plates of a first part of the generator is shown a 11a,b,c and d and each bear or comprise on either side thereof a circumferential sequence of permanent magnets 12 and 13 to form a magnetic annulus. Facing magnets are in attraction across the air gap 14, as shown by the symbols S and N. The rotors are mounted upon an elongate central member 15 (in the form of a shaft), both for locating them relative to one another and to communicate torque thereto from an external source (not shown). A stack of fixed stator plates 16a,b and c of a second part of the generator is located within the air gaps 14, and carry a sequence of coils 17 around their peripheries. Electrical power is generated as the rotors are caused to turn by means of the shaft 15, so causing the magnetic flux crossing the air gaps to cut the turns of the coils embedded in the stators.

In practice, it is desirable to construct such an arrangement with the minimum feasible air gap between the surfaces of the magnets and the coils. The smaller the gap, the greater the density of magnetic flux and thus the electromagnetic force (emf) generated. However, as is evident from consideration from the arrangement shown, any axial displacement of the rotors, which may arise for example through mechanical misalignment or parasitic vibrations arising during generation as indicated by the arrows 18, could cause the magnets to scrape against the stators sandwiched by them.

Figure 2:
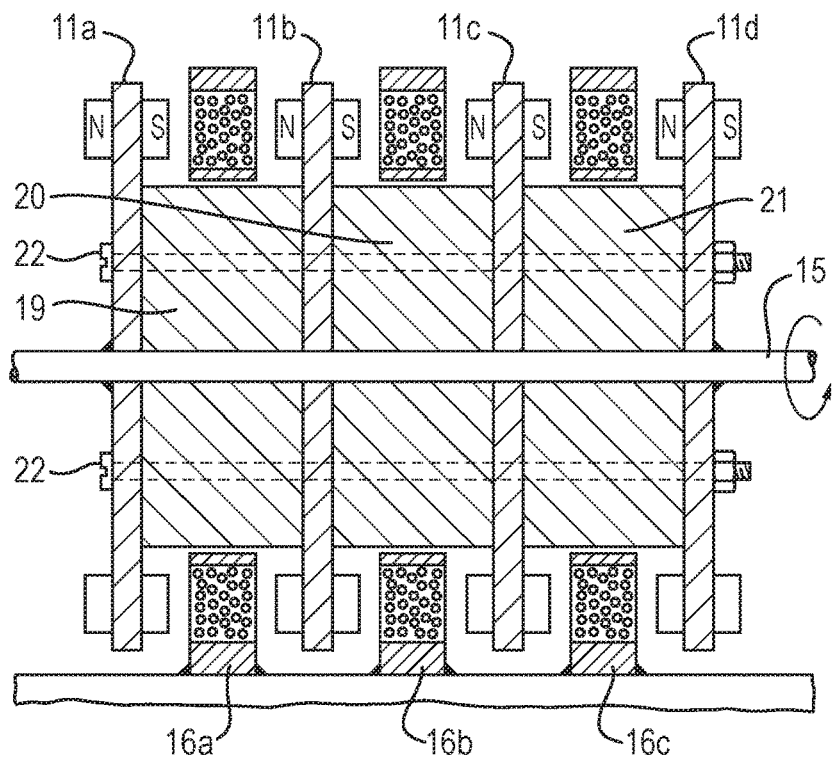
FIG. 2 shows rotors with interspaced tubular support members.

A solution to this, in accordance with the present invention, is shown with reference to FIG. 2, where the same components as shown in FIG. 1 are designated with the same reference numerals. However, in this implementation, key components are added. These are the spacers 19, 20 and 21, preferably in the form of tubular members. The centre of the stator is enlarged compared to the arrangement in FIG. 1, as shown, to accommodate the spacers passing through them. The spacers abut against the sides of the rotors to provide lateral stability and, in effect, substantially to eliminate any propensity to lateral vibrations. The spacers are held in rigid contact with the rotors by means of tie bolts 22 passing through the entire assembly. Thus the spacers are coaxially mounted around or upon the central member 15 in between inner annular portions of each rotor and abutting against them in such a manner such as to brace them to remain orthogonal to the longitudinal axis of assembly as well as providing the required spacing therebetween. Outer annular portions of each rotor bear or comprise the magnets forming the magnetic annulus. The stators are interposed between the rotors and mounted over the spacers but having an inner clearance diameter greater than that of the outer diameter of the spacers.

The presence of the spacers allows for a tighter and safer optimisation of the air gap, for example down to a few millimeters, than would be possible without them when gaps as large as 10 mm or more may be necessary.

Figure 3:
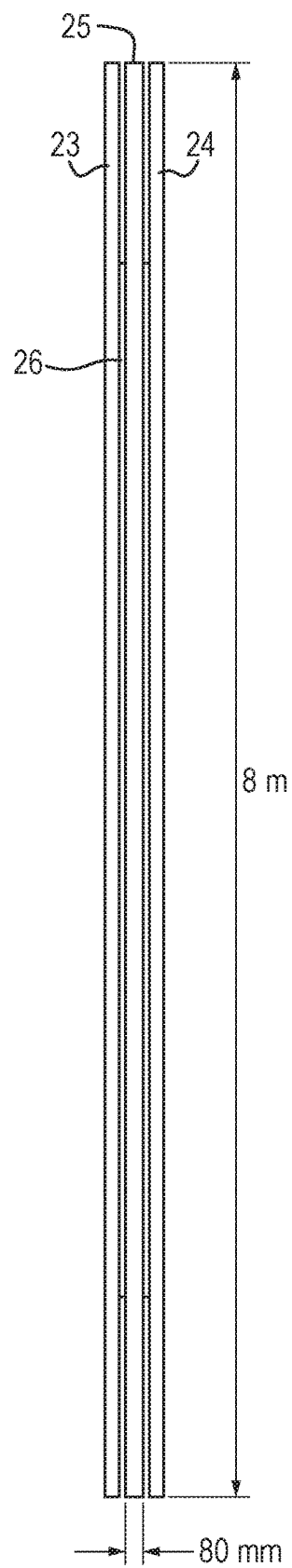
FIG. 3 shows a schematic of rotors and a stator to scale.

The importance of the function of the tubular members is best considered with reference to FIG. 3. The arrangements of FIGS. 1 and 2 are in no way shown to scale, but are illustrated at these proportions for clarity. However, an actual implementation to scale of a generator constructed in accordance with the present invention is shown in this FIG. 3. Two rotors 23 and 24 are shown sandwiching a stator 25. The scaling of the figure shows the two rotors at a diameter of eight meters, but only 80 mm in overall thickness (including the magnets mounted thereon). Similarly the stator 25 is shown also having a thickness of only 80 m. (The necessity for these modest dimensions relates to considerations of electromagnetic design, in particular the optimum utilisation of magnetic material and the field strengths arising for generation of electricity.) Thus an impression can be gained of the importance of the use of the spacers, as shown in FIG. 3 at 26, in bracing the rotors and preventing any occurrence of axial flexure.

For larger scale generators constructed in accordance with the present invention, the radial width of the outer annulus portion of the rotor (being the portion bearing the permanent magnets) is selected to occupy only a fraction of its overall radial dimension, for example the outer half or less or the outer third or less, perhaps just one meter out of three. The reason being that electromotive forces induced in the stator coils by the rotor magnets are proportional to the translational velocity of the fields cutting them, and the greatest velocity of course is present at the furthest possible diameter. It is advantageous therefore to concentrate the rotor and stator generating areas to this outer band. The effect is further influenced by the fact that the number of magnets and stator coils placed circumferentially around the rotor and stator is also directly proportional to the radius at which they are active. Thus, combining these two effects, a band of magnets and coils active at a radius of three meters is nine times as effective in terms of generation as a band operating at one meter.

It can therefore be appreciated that the remaining diameter of the inner annulus portion of the rotor will be a substantial proportion of the overall diameter, for example 66%, taking the foregoing example. This leaves free a significant area to be braced by a wide diameter spacer or tubular member, to the advantage of the stability of the rotor. Thus the outer diameter of the spacers is desirably at least half, preferably at least two thirds of the outer diameter of the magnetic annulus.

This corresponding wide diameter of the spacer or tubular member however necessitates a correspondingly even wider inner clearance diameter of the stator plate sandwiched between rotors, so reducing the overall amount of material comprising the stator. This is disadvantageous in terms of mechanical rigidity, as the stator must be capable itself of withstanding the very high torques arising during generation.

Figure 4:
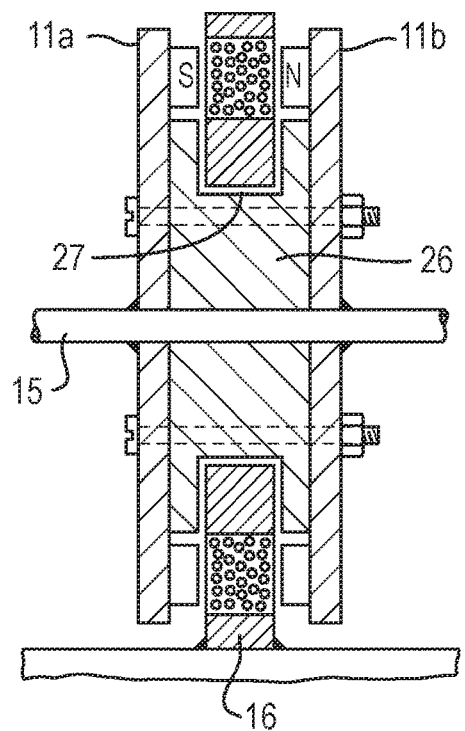
FIG. 4 shows the rotors of FIG. 2 with a modified profile tubular member.

Referring to FIG. 4, the arrangement of FIG. 2 is again shown, but with a modification to the tubular member 26. The central portion of the tubular member is shown at 27 but with a reduced diameter. The reason for this modification is as follows. During generation, the body of the stator is subject as aforesaid to very considerable torque, arising as a consequence of the emfs generated within its coils. For larger generators, this may reach hundreds of thousands of Newton meters. The body of the stator must be able to withstand these forces and avoid any stress fractures or other mechanical breakdowns arising over life from the cyclical internal torque forces it will experience.

Figure 5:
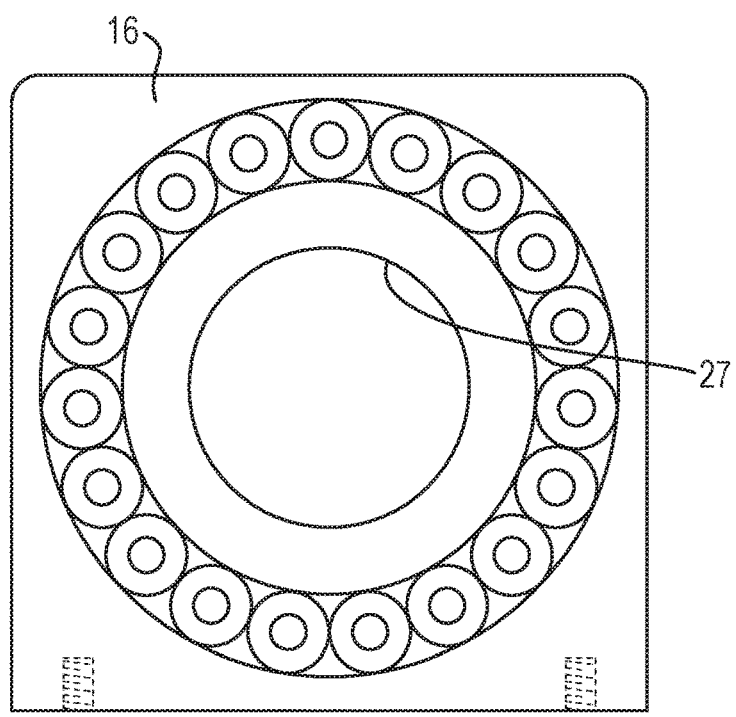
FIG. 5 shows a face on view of the stator of FIG. 4.

The presence of the step change 27 in external diameter of the tubular member 26 allows for the stator to benefit in terms of constructional strength from a commensurate reduction in internal diameter, as shown in FIG. 5 at 27, and thus better to cope with the aforementioned internal forces.

Thus, the diameter of the cross section of the spacers at a longitudinal position corresponding to a stator is less than the diameter of portions of spacers pressing against sides of the rotors.

For larger generators, the weight of rotor plates is significant. The plates of a twenty rotor plate assembly may weigh in excess of 40 tonnes. This is undesirable for many installations, particularly for example where the generator is used within the nacelle of an off shore wind turbine. In this specific case, the weight of a generator reflects severely on the size and cost of the construction of sea bed foundations and the like.

Figure 6:
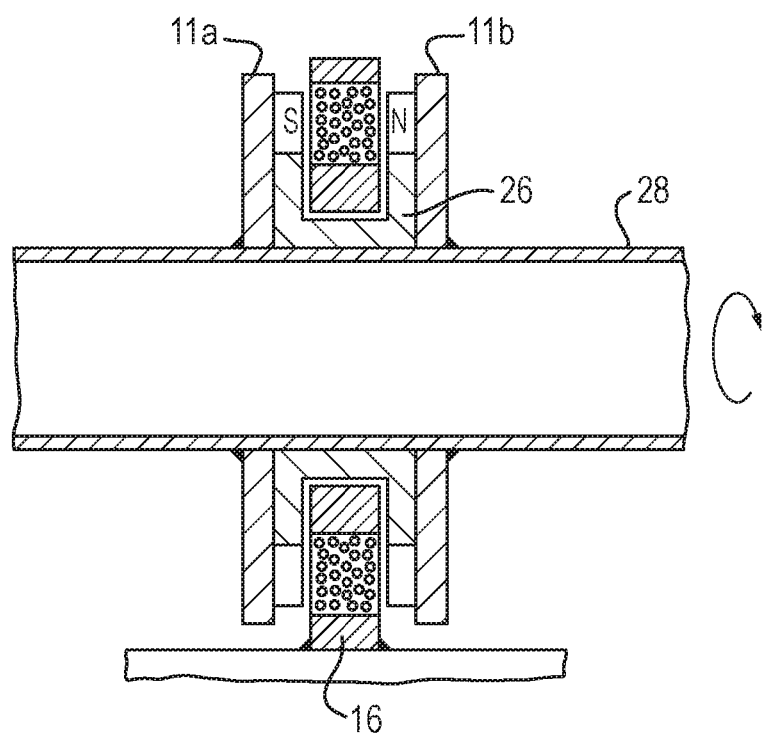
FIG. 6 shows the rotors of FIG. 2 mounted upon a central cylinder.

A method of reducing this weight is shown at FIG. 6. Rather than the rotors being affixed to a central axle, as shown at 15 in FIGS. 1 and 2, they are instead mounted upon the external surface of a cylinder 28. The cylinder is supported by bearing means (not shown) and serves both to locate the rotors and to communicate torque thereto. Use of the cylinder, rather than the aforementioned axle, results in a considerable saving in weight, for example, nearly halving the foregoing weight of 40 tonnes to just 22. The cylinder may be fabricated from Aluminium, and for the sized example in question, will weigh as little as 1.8 tonnes.

A self evident saving is also manifest in terms of the lighter material contents of both the tubular member 26 and the rotors.

Locating and adhering permanent magnets onto a rotor plate during manufacture naturally requires some datum point to ensure consistent radial positioning throughout. A convenient method of securing this is shown with reference to FIG. 7, in which a face-on view of a rotor plate is shown at 11. Several permanent magnets are shown at 29, 30 and 31. The tubular member shown at 26 in FIG. 6 is shown as the shaded circle 29 (and the cylinder at 28). The external diameter of the tubular member d where it abuts the rotor is selected to equal the designed internal diameter of the annulus formed by the magnets. By this means, the magnets may be simply located up (e.g. abutted) against the member 29 to procure their correct and consistent radial registration during the assembly process.

Figure 7:
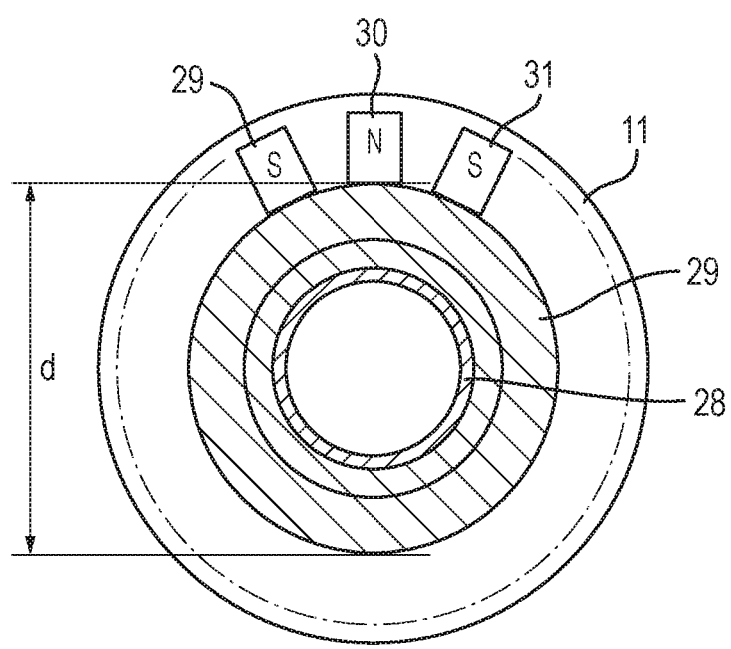
FIG. 7 is a face on view of a rotor plate and tubular member affixed thereto.
Figure 8:
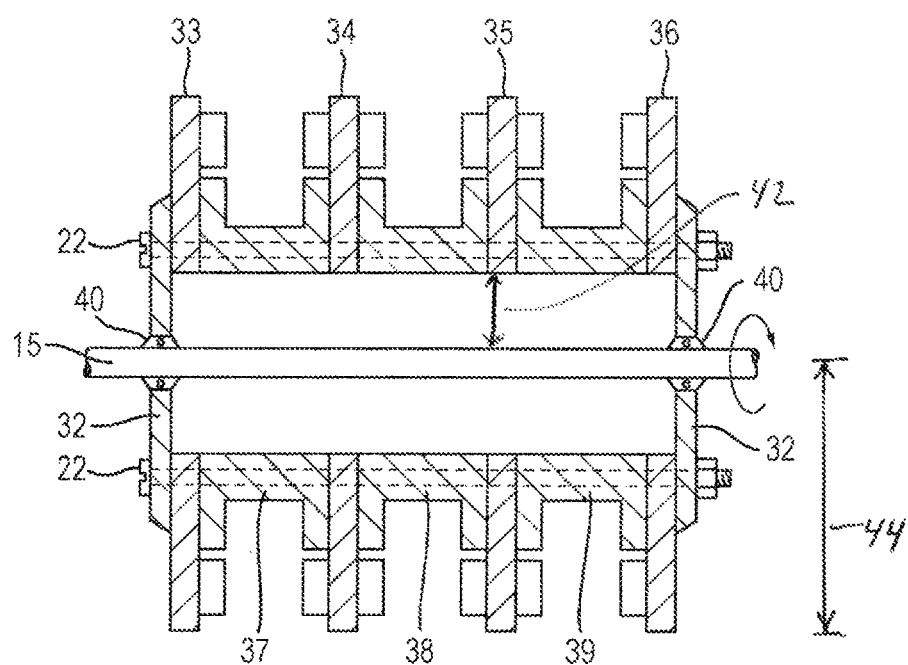
FIG. 8 is a cross-section of a further embodiment.

The mechanical strength, diameter and straightness of commercially available draw bolts, such as those shown at 22 in FIGS. 2, 4 and 8, is remarkable. For example, regarding tolerance variations in cross section diameter, these can be as low as within +−0.1 mm for a bolt of nominal diameter 20 mm. Taking advantage of this quality, and in accordance with a further aspect of the invention, the aforesaid aluminium cylinder 28 of FIGS. 6 and 7 is omitted altogether. In this case, and in the absence of the cylinder, the placing and precision drilling of through holes in the rotors 33,34,35,36 and the spacers 37,38,39 sandwiched between them, is defined sufficiently tightly to hold all the rotors and their intermediate spacers in line with one another once the draw bolts 22 have been tightened. Although not mechanically perfect in as much that some tolerance spacing must be present to allow for the threading through of the bolts 22 during assembly, practical experimentation shows this method to be perfectly viable. This method is particularly suited for lower rpm generators where it is not essential that the rotors are perfectly balanced. Taking the aforesaid example, the overall weight is thus further reduced by 1.35 tonnes, and there is also a commensurate reduction in cost and assembly.

A plurality of the draw bolts 22 pass through the first part (i.e. through the rotors and the spacers) to hold the rotors and spacers together longitudinally. In one 15 embodiment the spacers are held in contact with the rotors by the draw bolts 22. As shown in FIG. 8, the spacers and rotors are radially spaced from the central axis, in particular from the elongate central member 15. This reduces weight. The distance 42 between the elongate central member 15 (or longitudinal axis) and the inner diameter of the rotors/the spacers may be between ½ and ⅔ the outer radius 44 of the rotors.

Where no cylinder is present, torque to the assembly can be communicated by means of an elongate central member 15 (axle) affixed to outer discs 32 affixed at each outer end to the rotor assembly, as shown at FIG. 8. The outer discs 32 sandwich the rotors and spacers. Torque is transferred from the elongate central member 15 to the rotors via the outer discs 32 (and via the draw bolts 22). In an embodiment only one outer disc 32 is present. The elongate central member 15 can be fixed to the outer disc(s) for transfer of torque as aforesaid, or the outer disc(s) can rotate on bearings 40 upon the central member, in this case fixed. The elongate central member 15 advantageously passes through the centre of the first part to evenly support the first part. However, in an embodiment the elongate central member 15 does not pass through the (entire) first part and (only) projects axially on one side of the first part.

Numerous variations will be apparent to those skilled in the art.

The invention claimed is:

1. A wind turbine generator comprises as a first part a stack of disc-like annular rotors spaced one from the other and rotating with an elongate central member each rotor having an inner annular portion coaxial with and spaced apart from the elongate central member and an outer annular portion, the outer annular portion bearing and/or comprising a magnetic annulus, one or more spacers being coaxially mounted around the elongate central member in between the inner annular portions of each rotor and abutting against them in such manner such as to brace them to remain orthogonal to the longitudinal axis of the assembly as well as providing the required spacing therebetween, and the first part further comprising outer discs sandwiching the rotors and the spacers and a plurality of bolts passing through the first part and holding the spacers in contact with the rotors, the outer discs connected to the central axis, the outer discs and the bolts transferring all of the torque from the rotors to the elongate central member, and as a second part, a stack of annular stators interposed between the rotors and mounted over the spacers but having an inner clearance diameter greater than that of the outer diameter of the portion of spacer over which they are located, wherein the diameter of the cross section of the spacers at a longitudinal position corresponding to a stator is less than the diameter of portions of spacers pressing against sides of the rotors.

2. A generator according to claim 1 wherein the spacers comprise one of more tubular members.

3. A generator according to claim 1 wherein the elongate central member upon which the rotors are mounted is in the form of a cylinder.

4. A generator according to claim 1 wherein permanent magnets of the magnetic annulus abut against the spacer.

5. A generator according to claim 1, wherein the outer diameter of the spacers is at least half, preferably at least two thirds of the outer diameter of the magnetic annulus.

6. A generator according to claim 1, wherein the spacers and/or rotors are radially spaced from the elongate central member.

7. A generator according to claim 1, wherein a distance between the central longitudinal axis of the first part and an inner diameter of the rotors and/or spacers is at least ½ of the outer radius of the rotors.

* * * * *